(12) United States Patent
Wirnitzer

(10) Patent No.: US 9,604,333 B2
(45) Date of Patent: Mar. 28, 2017

(54) ELECTRIC MACHINE TOOL COMPRISING A STARTING INHIBITOR

(75) Inventor: Bernd Wirnitzer, Friolzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1307 days.

(21) Appl. No.: 13/504,611

(22) PCT Filed: Aug. 30, 2010

(86) PCT No.: PCT/EP2010/062603
§ 371 (c)(1),
(2), (4) Date: Aug. 21, 2012

(87) PCT Pub. No.: WO2011/051016
PCT Pub. Date: May 5, 2011

(65) Prior Publication Data
US 2012/0306291 A1    Dec. 6, 2012

(30) Foreign Application Priority Data
Oct. 28, 2009  (DE) ................. 10 2009 046 116

(51) Int. Cl.
*H01H 43/00*  (2006.01)
*B23Q 5/10*  (2006.01)
*B23Q 11/00*  (2006.01)
*B25F 5/00*  (2006.01)

(52) U.S. Cl.
CPC ............ *B23Q 5/10* (2013.01); *B23Q 11/0092* (2013.01); *B25F 5/00* (2013.01); *Y10T 307/951* (2015.04)

(58) Field of Classification Search
None
See application file for complete search history.

(56) References Cited

U.S. PATENT DOCUMENTS

2002/0117902 A1* 8/2002 Evers et al. ................. 307/130
2003/0202851 A1* 10/2003 Kovarik ............................ 408/8

FOREIGN PATENT DOCUMENTS

| CN | 201038800 | 3/2008 |
|---|---|---|
| DE | 10 2007 027898 | 8/2002 |
| DE | 103 60 165 | 9/2005 |
| EP | 0 141 166 | 5/1985 |

* cited by examiner

*Primary Examiner* — Jared Fureman
*Assistant Examiner* — Aqeel Bukhari
(74) *Attorney, Agent, or Firm* — Gerard Messina

(57) ABSTRACT

In an electric machine tool having an electronics unit for implementing a starting lockout, the electric machine tool being connectable to an associated power source in an electrically conductive manner, the electronics unit is configured to receive power from the power source only for a limited, predefined period of time after an electrically conductive connection between the electric machine tool and the power source has been established.

16 Claims, 3 Drawing Sheets

ELECTRIC MACHINE TOOL COMPRISING A STARTING INHIBITOR

FIELD OF THE INVENTION

The present invention relates to an electric machine tool having an electronics unit for implementing a starting lockout, the electric machine tool being connectable to an associated power source in an electrically conductive manner.

BACKGROUND INFORMATION

Electric machine tools are understood from the related art which are connectable to an associated power source in an electrically conductive manner and which have an on/off switch which, after this type of electrically conductive connection is established, is switchable between an "on" position and an "off" position for switching the electric machine tool on and off. The power source may be, for example, an associated battery pack, or a power network which is connectable to the electric machine tool via an associated power plug.

To prevent the electric machine tool from automatically restarting if its switch is still in its "on" position after the electrically conductive connection is interrupted, for example due to the power plug being accidentally pulled out, the electric machine tool may have a restarting lockout. This restarting lockout is usually implemented with the aid of a monitoring unit which is used to monitor an operating voltage provided by the power source as well as a switch position of the on/off switch, and if the operating voltage is detected after an interruption of the electrically conductive connection, to prevent the electric machine tool from starting if the on/off switch is still in its "on" position.

A disadvantage of the related art is that this type of restarting lockout is continuously connected to the associated power source in an electrically conductive manner to allow detection of the operating voltage, and therefore has a corresponding power consumption even when the electric machine tool is in the idle state. In particular when a battery pack is used as the power source for the electric machine tool, this may result in creeping discharge, even total discharge, of the battery pack.

SUMMARY OF THE INVENTION

It is an object of the exemplary embodiment and/or exemplary method of the present invention, therefore, to provide a novel electric machine tool having a starting lockout, in which a creeping discharge of an associated battery pack is prevented by the starting lockout.

This object is achieved by an electric machine tool having an electronics unit for implementing a starting lockout, the electric machine tool being connectable to an associated power source in an electrically conductive manner. The electronics unit is configured to receive power from the power source only for a limited, predefined period of time after an electrically conductive connection between the electric machine tool and the power source has been established.

The exemplary embodiment and/or exemplary method of the present invention thus allow the power consumption of the electronics unit to be minimized for implementing the starting lockout.

The electric machine tool may have a switch that is switchable between an "on" position and an "off" position for switching the electric machine tool on and off. The electronics unit may be configured to prevent the electric machine tool from starting if the switch is in the "on" position when the electrically conductive connection between the electric machine tool and the power source is established.

Undesired starting of the electric machine tool may thus be safely and reliably prevented.

According to one specific embodiment, the electronics unit has a detection unit which is configured to detect an action of an operating voltage, provided by the power source, upon the electric machine tool when the electrically conductive connection between the electric machine tool and the power source is established.

The exemplary embodiment and/or exemplary method of the present invention thus allow an action of an operating voltage, provided by the power source, upon the electric machine tool to be detected using inexpensive components.

The detection unit may be configured to output a temporary indicator signal when an operating voltage provided by the power source acts upon the electric machine tool, the temporary indicator signal indicating the action of the operating voltage upon the electric machine tool. The indicator signal may be implementable by generating a voltage signal, a current signal, or a predefined state in a nonvolatile memory medium.

The indication of the action of the operating voltage upon the electric machine tool may thus be easily achieved.

The electronics unit may have an evaluation unit which is configured, as a function of the indicator signal, to prevent the electric machine tool from starting if the switch is in the "on" position.

Undesired starting of the electric machine tool may thus be safely and reliably prevented if the switch is already or still in the "on" position when the electrically conductive connection between the electric machine tool and the power source is established.

According to one specific embodiment, the electronics unit is configured to detect a cessation of the operating voltage provided by the power source when the electrically conductive connection between the electric machine tool and the power source is interrupted, and to cause the switch to be switched from the "on" position into the "off" position.

Thus, by simply switching the switch when the electrically conductive connection between the electric machine tool and the power source is interrupted, the present invention allows undesired starting of the electric machine tool to be effectively prevented when this electrically conductive connection is re-established.

A reset element for switching the switch from the "on" position into the "off" position may be associated with the switch, and a holding element for holding the reset element may be associated with the electronics unit. The electronics unit may be configured to control the holding element to enable the reset element when the operating voltage provided by the power source ceases.

An effective and uncomplicated holding/reset unit may thus be implemented.

According to one specific embodiment, the electronics unit has discrete components for differential evaluation of the operating voltage provided by the power source. The discrete components are configured to cooperate in such a way that freedom from quiescent current is made possible in the steady state.

The exemplary embodiment and/or exemplary method of the present invention thus allow a configuration of the electronics unit which is free of quiescent current as the result of using simple and inexpensive components.

The object mentioned at the outset is also achieved by a starting lockout having an electronics unit for an electric machine tool which is connectable to an associated power source in an electrically conductive manner. The electronics unit is configured to receive power from the power source only for a limited, predefined period of time after an electrically conductive connection between the electric machine tool and the power source has been established.

The exemplary embodiment and/or exemplary method of the present invention are explained in greater detail in the following description, with reference to exemplary embodiments illustrated in the drawings.

DETAILED DESCRIPTION

Figure 1:
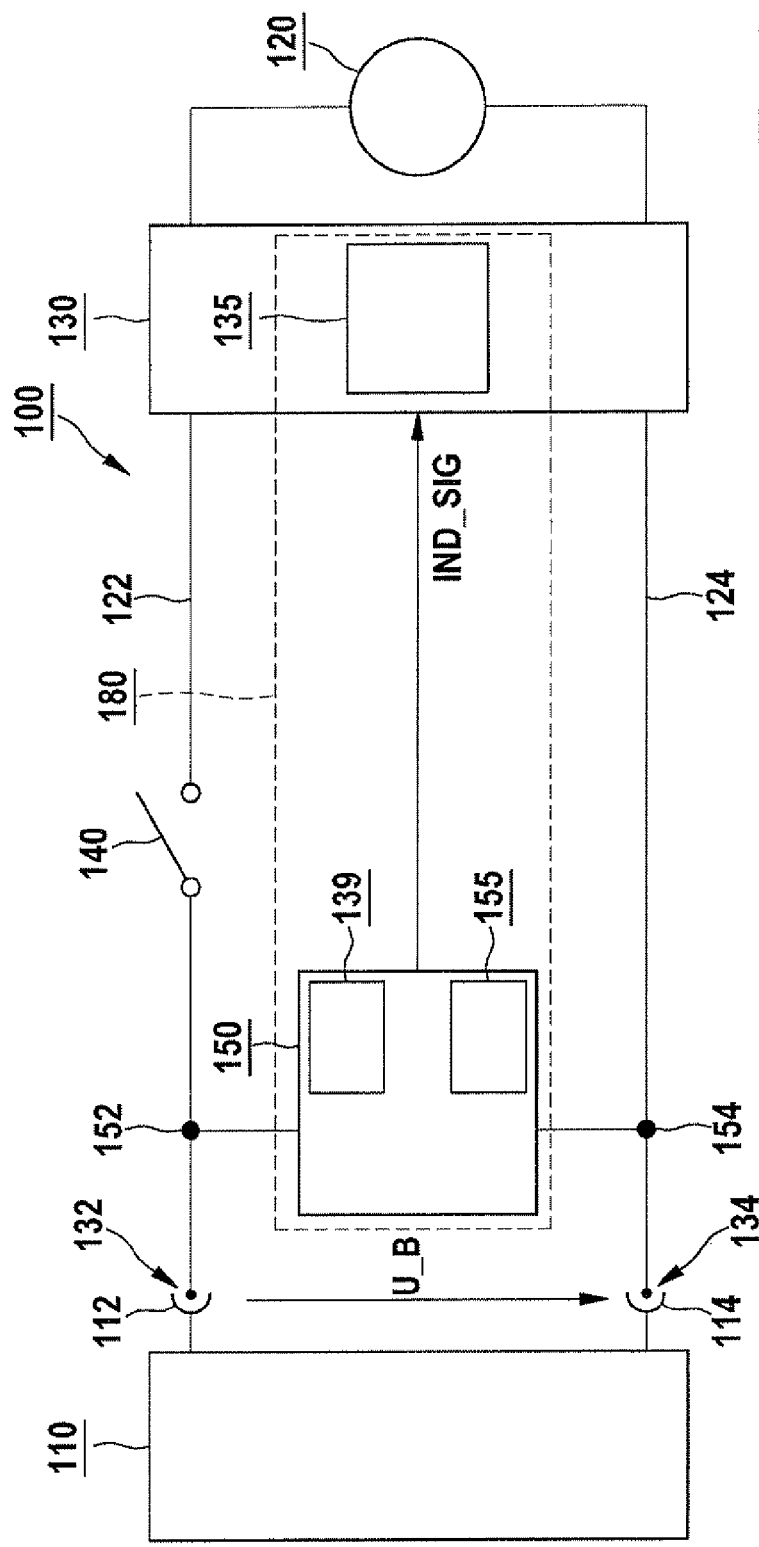
FIG. 1 shows a simplified circuit diagram of an electric machine tool which is connectable to a power source, according to a first specific embodiment.

FIG. 1 schematically shows an electric machine tool 100 which is connectable to a power source 110, having a drive unit 120 and a control unit 130 associated with same, according to a first specific embodiment. Electric machine tool 100 has, for example, at least two terminals 132, 134 which are connectable, mechanically and in an electrically conductive manner, to associated terminals 112, 114, respectively, of power source 110, between which an operating voltage U_B for operating electric machine tool 100 is provided. As illustrated, terminals 132, 134 are connected via associated lines 122 and 124, respectively, to control unit 130, which is configured to control drive unit 120. For example, a switch 140 that is switchable between an "on" position and an "off" position for switching electric machine tool 100 on and off is situated in line 122, the switch as illustrated being in its "off" position, and also being referred to below as an "on/off switch."

Electric machine tool 100 may be any given machine tool for which an associated tool is drivable with the aid of drive unit 120, for example a table saw, a chain saw, a circular saw, a belt grinder, an angle grinder, a drill, an impact drill, a hammer drill, a screwdriver, a combi drill, etc. According to one specific embodiment, electric machine tool 100 is a hand-held power tool, and power source 110 may be a battery pack which is mechanically and electrically connectable to the hand-held power tool for supplying power independently from a power network.

Drive unit 120 is, for example, an electric drive motor of any given type of motor which is supplied with current, for example an electronically commutated motor or a direct current motor. As illustrated, during operation this motor is controllable by control unit 130, which is configured to control a necessary energy flow to motor 120 during operation of motor 120. In this regard, drive motor 120 may be electronically controllable or regulatable in such a way that operation in reverse as well as inputs concerning a desired rotational speed are achievable. The mode of operation and the design of a suitable drive motor 120 and of associated control unit 130 are well known from the related art, so that a detailed description is dispensed with here for the sake of brevity of the description.

According to one specific embodiment, electric machine tool 100 has an electronics unit 180 for implementing a starting lockout, which is achieved, at least partially, with the aid of a circuit 155, configured from discrete components, for differential evaluation of operating voltage U_B provided by power source 110. Circuit 155 and/or detection unit 150 is/are configured to be free of quiescent current; i.e., in the steady state of circuit 155 or of detection unit 150 no quiescent current flows therein. A suitable design of circuit 155 or of detection unit 150 is easily implementable by those skilled in the art and is not the subject matter of the present invention, so that a detailed description is dispensed with here for the sake of brevity of the description. However, it is pointed out that the implementation of circuit 155 having discrete components is strictly an example, and is not to be construed as limiting the present invention. Instead, a different design of circuit 155 or of electronics unit 180 may be used, for example a design having a combination of discrete components and integrated components, and/or in the form of an integrated module.

Electronic unit 180 may be configured to prevent electric machine tool 100 from starting if on/off switch 140 is in the "on" position when an electrically conductive connection between electric machine tool 100 and power source 110 is established. According to one specific embodiment, electronics unit 180 receives power from power source 110 only for a limited, predefined period of time after the electrically conductive connection between electric machine tool 100 and power source 110 has been established, as described below.

As illustrated, electronics unit 180 has a detection unit 150 and an evaluation unit 135, which for example is associated with control unit 130. In addition, electronics unit 180 may have a nonvolatile memory medium 139, which for example is associated with detection unit 150 and which may operate without current in the idle state. However, it is pointed out that other designs are also possible which likewise are within the scope of the present invention. For example, memory medium 139 may be associated with control unit 130, and/or evaluation unit 135 may be a separate component which may control control unit 130 for preventing electric machine tool 100 from starting. In addition, electronics unit 180 and control unit 130 may also be configured as an individual electronic circuit.

Detection unit 150 is situated, for example, between two nodes 152 and 154 associated with lines 122, 124, respectively, node 152 being provided between terminal 132 and switch 140. Detection unit 150 is configured to detect an action of an operating voltage U_B, provided by power source 110, upon electric machine tool 100 when the electrically conductive connection between electric machine tool 100 and power source 110 is established. In such a detection, detection unit 150 may output a temporary indicator signal IND_SIG which is evaluatable by evaluation unit 135, and which indicates the action of operating voltage U_B upon electric machine tool 100. Temporary indicator signal IND_SIG is implementable, for example, by generating a voltage signal, a current signal, or a predefined state in nonvolatile memory medium 139, as described below.

Evaluation unit 135 may be configured to prevent, as a function of indicator signal IND_SIG, electric machine tool 100 from starting if on/off switch 140 is in the "on" position. For this purpose, according to one specific embodiment evaluation unit 135 may read out indicator signal IND_SIG, for example, from nonvolatile memory medium 139, as described below.

During operation of electric machine tool 100, as the result of an electrical and mechanical connection of terminals 132, 134 to terminals 112 and 114, respectively, for example by inserting an associated battery pack, in particular a suitable replaceable battery pack, into a replacement receptacle provided for this purpose on electric machine tool 100, an electrically conductive connection between electric machine tool 100 and power source 110 is established. Operating voltage U_B which is provided by power source 110 acts upon electric machine tool 100 via this electrically conductive connection, so that a current may flow in detection unit 150 which allows the action of the operating voltage to be detected. However, detection unit 150 is configured in such a way that this current flows only for a limited, predefined period of time T1, and therefore detection unit 150 receives power from the replaceable battery pack only during period of time T1. Period of time T1 may be dimensioned in such a way that a discharge or a total discharge of the replaceable battery pack as a result of the associated current flow is not possible, even when the above-described procedure is carried out repeatedly, in particular when on/off switch 140 is in the "off" position.

As a response to the detection of the action of operating voltage U_B upon electric machine tool 100, detection unit 150 generates temporary indicator signal IND_SIG described above. According to one specific embodiment, temporary indicator signal IND_SIG is a voltage signal or a current signal which is output during a limited, predefined period of time T2, it being possible for period of time T2 and period of time T1 to have different durations. The existence of this voltage signal or current signal is used as an indicator of the action of operating voltage U_B upon electric machine tool 100, i.e., as evidence that detection unit 150 has detected a transition from the voltage-free state to a state in which voltage acts. This detection may be carried out by detecting a voltage jump or a voltage ramp which results from the application of operating voltage U_B. In this regard, the voltage-free state may also be a state in which the voltage which is detectable by detection unit 150 is below a first threshold value, while the state in which voltage acts may also be a state in which the voltage which is detectable by detection unit 150 exceeds a second threshold value.

As an alternative to generating a voltage signal or current signal as indicator signal IND_SIG, as described above a predefined state for period of time T2 may be generated in nonvolatile memory medium 139. As memory medium 139, a bistable relay, for example, may be used in which one of the two possible states is set for period of time T2. Alternatively, an EEPROM, for example, may be used in which, for example, a corresponding bit is set at a predefined memory location for period of time T2.

According to one specific embodiment, evaluation unit 135 now determines an instantaneous state of electric machine tool 100 on the basis of temporary indicator signal IND_SIG and an instantaneous switch position of on/off switch 140. The instantaneous state may be determined at a point in time when a stable application of an instantaneous indicator signal IND_SIG may be ensured, evaluation unit 135 preventing electric machine tool 100 from starting until a predefined point in time after this determination. Electric machine tool 100 may thus be prevented from starting before a reliable evaluation by evaluation unit 135 has been carried out.

For the case that during period of time T2 evaluation unit 135 determines, on the basis of indicator signal IND_SIG, an action of operating voltage U_B, which is provided by power source 110, upon electric machine tool 100, i.e., either a corresponding voltage signal or current signal is present at evaluation unit 135 or a corresponding bit is readable from nonvolatile memory medium 139, evaluation unit 135, for example by suitably controlling control unit 130, prevents drive motor 120 from starting if switch 140 is in the "on" position. If switch 140 is in the "off" position, it is not necessary for evaluation unit 135 to lock out the starting of drive motor 120.

For the case that evaluation unit 135 does not determine any action of operating voltage U_B, which is provided by power source 110, upon electric machine tool 100, it is likewise not necessary for evaluation unit 135 to lock out the starting of drive motor 120. Thus, electric machine tool 100 may start without intervention by evaluation unit 135, or not start, depending on the instantaneous switch position of on/off switch 140.

Figure 2:
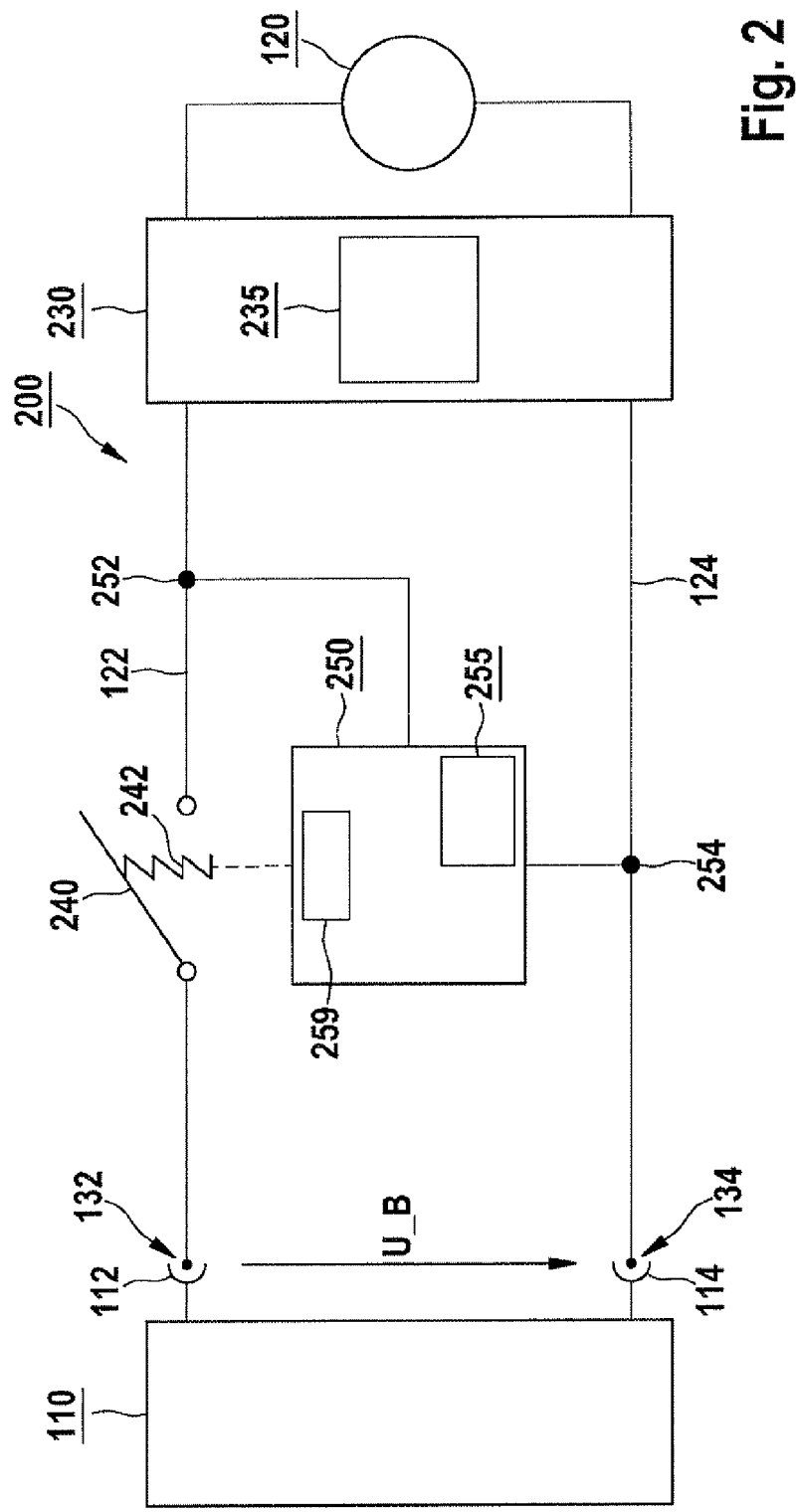
FIG. 2 shows a simplified circuit diagram of an electric machine tool which is connectable to a power source, according to a second specific embodiment.

FIG. 2 schematically shows an electric machine tool 200, which is connectable to power source 110 from FIG. 1, having drive unit 120 from FIG. 1 and a control unit 230 associated with same, according to a second specific embodiment. Electric machine tool 200, the same as electric machine tool 100 from FIG. 1, may be any given machine tool for which an associated tool is drivable with the aid of drive unit 120. Control unit 230 associated with drive unit 120 may have the same design as control unit 130 from FIG. 1, with the exception of evaluation unit 135 from FIG. 1. According to one specific embodiment, control unit 230 has the design of a customary control unit known to those skilled in the art, and is provided, for example, with a restarting lockout 235 known from the related art. This restarting lockout may also be provided in control unit 130 from FIG. 1.

Electric machine tool 200, the same as electric machine tool 100 from FIG. 1, has lines 122, 124 together with the two terminals 132 and 134, respectively, which are connectable, mechanically and in an electrically conductive manner, to associated terminals 112 and 114, respectively, of power source 110. For example, a switch 240 that is provided for switching electric machine tool 200 on and off and that is switchable between an "on" position and an "off" position is situated in line 122, the switch as illustrated being in its "off" position, and also being referred to below as an "on/off switch."

According to one specific embodiment, on/off switch 240 is in operative connection with an electronics unit 250 which is situated, for example, between two nodes 252 and 254 associated with lines 122, 124, respectively, node 252 being provided between switch 240 and control unit 230. A holding element 259, for example, which is in operative engagement with a reset element 242 associated with on/off switch 240, is associated with this electronics unit 250. Reset element 242 is configured to exert a restoring force on on/off switch 240 to move same from the "on" position into the "off" position. A restoring energy necessary for this purpose is storable in reset element 242 as electrical energy, for example. However, it is pointed out that other forms of energy may also be used. For example, reset element 242 may have a compression spring in which the restoring energy is storable in the form of mechanical energy.

Electronics unit 250 is implemented, at least partially, with the aid of a circuit 255, configured from discrete components, for evaluating operating voltage U_B which is provided by power source 110, and is configured to implement a starting lockout for electric machine tool 200. Circuit 255, the same as circuit 155 from FIG. 1, may be configured to be free of quiescent current; i.e., in the steady state of circuit 255 no quiescent current flows therein. A suitable design of circuit 255 is easily implementable by those skilled in the art and is not the subject matter of the present invention, so that a detailed description is dispensed with here for the sake of brevity of the description. However, it is pointed out that the implementation of circuit 255 using discrete components is strictly an example, and is not to be construed as limiting the present invention. Instead, a different design of circuit 255 or of electronics unit 250 may also be used, for example a design having a combination of discrete components and integrated components, and/or in the form of an integrated module.

During operation of electric machine tool 200, as the result of an electrical and mechanical connection of terminals 132, 134 to terminals 112 and 114, respectively, for example by inserting an associated battery pack, in particular a suitable replaceable battery pack, into a replacement receptacle provided for this purpose on electric machine tool 200, an electrically conductive connection between electric machine tool 200 and power source 110 is established. Operating voltage U_B which is provided by power source 110 acts upon electric machine tool 200 via this electrically conductive connection.

If on/off switch 240 is now moved by a first activation into the "on" position, for example, a current may flow in electronics unit 250 which allows detection of the action of operating voltage U_B, which is provided by power source 110, upon electric machine tool 200. As a response to the detection of the action of operating voltage U_B upon electric machine tool 200, holding element 259 is activated, which then holds on/off switch 240 in the "on" position, against the restoring force exerted by reset element 242. Self-holding of on/off switch 240 is thus brought about, which may be maintained until on/off switch 240 is moved into its "off" position by reactivation, or until the electrically conductive connection established between electric machine tool 200 and power source 110 is interrupted.

According to one specific embodiment, electronics unit 250 is configured to detect a cessation of operating voltage U_B, which is provided by power source 110, when the electrically conductive connection between electric machine tool 200 and power source 110 is interrupted, and to cause switch 240 to be switched from the "on" position into the "off" position. For this purpose, electronics unit 250 controls holding element 259 to enable reset element 242 when operating voltage U_B provided by power source 110 ceases. Due to its restoring force, enabled reset element 242 now moves on/off switch 240 into the "off" position. When on/off switch 240 is in the "off" position, it is no longer possible for current to flow in electronics unit 250 due to its configuration between nodes 252 and 254.

Figure 3:
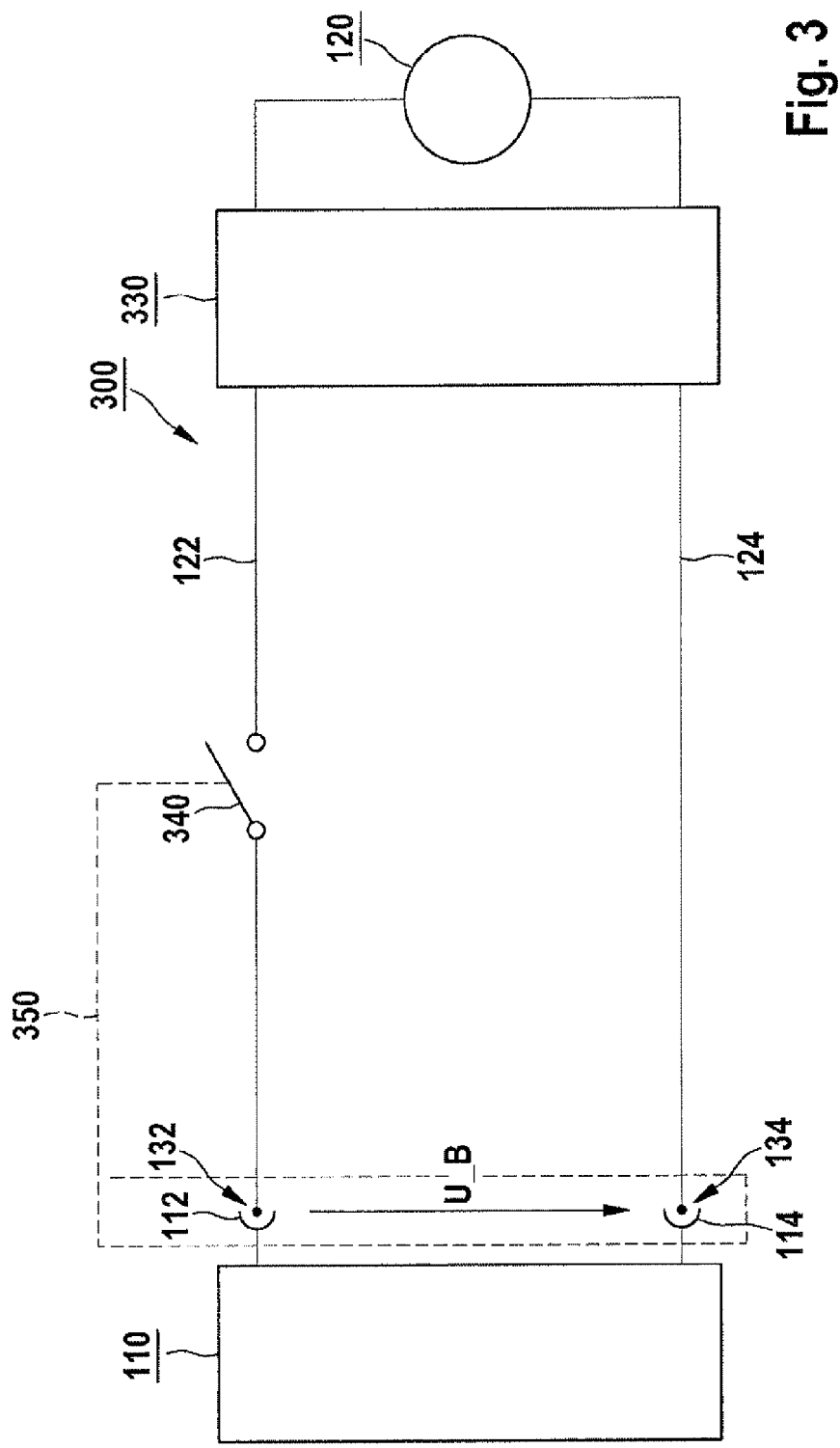
FIG. 3 shows a simplified circuit diagram of an electric machine tool which is connectable to a power source, according to a third specific embodiment.

FIG. 3 schematically shows an electric machine tool 300, which is connectable to power source 110 from FIG. 1, having drive unit 120 from FIG. 1 and a control unit 330 associated with same, according to a third specific embodiment. Electric machine tool 300 may be any given machine tool which is operable with the aid of a replaceable battery pack, for which an associated tool is drivable with the aid of drive unit 120. Corresponding examples are described above for FIG. 1. Control unit 330 associated with drive unit 120 may have the same design as control unit 230 from FIG. 2.

Electric machine tool 300, the same as electric machine tool 100 from FIG. 1, has lines 122, 124 together with the two terminals 132 and 134, respectively, which are connectable, mechanically and in an electrically conductive manner, to associated terminals 112 and 114, respectively, of power source 110. For example, a switch 340 that is provided for switching electric machine tool 300 on and off and that is switchable between an "on" position and an "off" position is situated in line 122, the switch as illustrated being in its "off" position, and also being referred to below as an "on/off switch."

According to one specific embodiment, a mechanical coupling 350 associated with on/off switch 340 is provided on electric machine tool 300. This mechanical coupling is configured to move on/off switch 340 into the "off" position when an electrically conductive connection between electric machine tool 300 and a replaceable battery pack which forms power source 110 is established. In addition, mechanical coupling 350 may be configured to prevent insertion of the replaceable battery pack into a replacement receptacle provided for this purpose on electric machine tool 300 when on/off switch 340 is in the "on" position. Furthermore, mechanical coupling 350 may be configured to move on/off switch 340 into the "off" position when the electrically conductive connection between electric machine tool 300 and the replaceable battery pack is interrupted.

What is claimed is:

1. An electric machine tool, comprising:
an electronics unit for implementing a starting lockout, the electric machine tool being connectable to an associated power source in an electrically conductive manner, wherein the associated power source is a replaceable battery pack;
wherein the electronics unit is configured to receive power from the power source only for a limited, predefined period of time after an electrically conductive connection between the electric machine tool and the power source has been established,
wherein the electronics unit includes a detection unit which is configured to detect an action of an operating voltage, provided by the power source, upon the electric machine tool when the electrically conductive connection between the electric machine tool and the power source is established, and
wherein the limited, predefined period of time is determined so that a total discharge of the replaceable battery pack is not possible.

2. The electric machine tool of claim 1, further comprising:
a switch that is switchable between an "on" position and an "off" position for switching the electric machine tool on and off;
wherein the electronics unit is configured to prevent the electric machine tool from starting if the switch is in the "on" position when the electrically conductive connection between the electric machine tool and the power source is established.

3. The electric machine tool of claim 2, wherein the detection unit is configured to output a temporary indicator signal when the operating voltage provided by the power source acts upon the electric machine tool, the temporary indicator signal indicating the action of the operating voltage upon the electric machine tool.

4. The electric machine tool of claim 3, wherein the temporary indicator signal is implementable by generating a voltage signal, a current signal, or a predefined state in a nonvolatile memory medium.

5. The electric machine tool of claim 3, wherein the electronics unit has an evaluation unit which is configured, as a function of the indicator signal, to prevent the electric machine tool from starting if the switch is in the "on" position.

6. The electric machine tool of claim 2, wherein the electronics unit is configured to detect a cessation of the operating voltage provided by the power source when the electrically conductive connection between the electric machine tool and the power source is interrupted, and to cause the switch to be switched from the "on" position into the "off" position.

7. The electric machine tool of claim 6, wherein a reset element for switching the switch from the "on" position into the "off" position is associated with the switch, and a holding element for holding the reset element is associated with the electronics unit, the electronics unit being configured to control the holding element to enable the reset element when the operating voltage provided by the power source ceases.

8. The electric machine tool of claim 2, wherein the electronics unit has discrete components for differential evaluation of the operating voltage provided by the power source, the discrete components being configured to cooperate so that freedom from quiescent current is made possible in the steady state.

9. A starting lockout, comprising:
   an electronics unit for an electric machine tool which is connectable to an associated power source in an electrically conductive manner, wherein the associate power source is a replaceable battery pack;
   wherein the electronics unit is configured to receive power from the power source only for a limited, predefined period of time after an electrically conductive connection between the electric machine tool and the power source has been established,
   wherein the electronics unit includes a detection unit which is configured to detect an action of an operating voltage, provided by the power source, upon the electric machine tool when the electrically conductive connection between the electric machine tool and the power source is established, and
   wherein the limited, predefined period of time is determined so that a total discharge of the replaceable battery pack is not possible.

10. The electric machine tool of claim 2, wherein the switch is mechanically coupled to the replaceable battery pack.

11. The electric machine tool of claim 10, wherein the mechanical coupling of the switch and the replaceable battery pack is configured to move the switch into the "off" position when the electrically conductive connection is established.

12. The electric machine tool of claim 10, wherein the mechanical coupling of the switch and the replaceable battery pack is configured to prevent the electrically conductive connection between the replaceable battery pack and the electric machine tool when the switch is in the "on" position.

13. The starting lockout of claim 9, further comprising:
    a switch that is switchable between an "on" position and an "off" position for switching the electric machine tool on and off;
    wherein the electronics unit is configured to prevent the electric machine tool from starting if the switch is in the "on" position when the electrically conductive connection between the electric machine tool and the power source is established.

14. The electric machine tool of claim 13, wherein the switch is mechanically coupled to the replaceable battery pack.

15. The electric machine tool of claim 14, wherein the mechanical coupling of the switch and the replaceable battery pack is configured to move the switch into the "off" position when the electrically conductive connection is established.

16. The electric machine tool of claim 14, wherein the mechanical coupling of the switch and the replaceable battery pack is configured to prevent the electrically conductive connection between the replaceable battery pack and the electric machine tool when the switch is in the "on" position.

* * * * *